United States Patent
Shibayama et al.

(10) Patent No.: US 10,625,839 B2
(45) Date of Patent: *Apr. 21, 2020

(54) BOAT AND BOAT MANEUVERING SYSTEM

(71) Applicant: YAMAHA HATSUDOKI KABUSHIKI KAISHA, Iwata-shi, Shizuoka (JP)

(72) Inventors: Susumu Shibayama, Shizuoka (JP); Nobuharu Ota, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 108 days.

This patent is subject to a terminal disclaimer.

(21) Appl. No.: 15/972,266

(22) Filed: May 7, 2018

(65) Prior Publication Data

US 2018/0251203 A1    Sep. 6, 2018

Related U.S. Application Data

(63) Continuation-in-part of application No. 15/461,513, filed on Mar. 17, 2017, now Pat. No. 10,040,532.

(30) Foreign Application Priority Data

Oct. 25, 2016  (JP) ................................ 2016-208408

(51) Int. Cl.
  *B63H 21/21*   (2006.01)
  *B63H 25/02*   (2006.01)
  *B62D 1/04*    (2006.01)
  *B63H 20/08*   (2006.01)

(52) U.S. Cl.
  CPC .......... *B63H 21/213* (2013.01); *B62D 1/046* (2013.01); *B63H 25/02* (2013.01); *B63H 20/08* (2013.01); *B63H 2025/022* (2013.01)

(58) Field of Classification Search
  USPC ........................................................ 701/21
  See application file for complete search history.

(56) References Cited

U.S. PATENT DOCUMENTS

| | | | |
|---|---|---|---|
| 6,264,513 B1 * | 7/2001 | Marsh .................... | B63B 39/061 114/286 |
| 10,040,532 B2 * | 8/2018 | Shibayama ............ | B63H 11/02 |
| 2006/0240720 A1 * | 10/2006 | Yamashita ............. | B63H 20/12 440/1 |
| 2014/0224600 A1 * | 8/2014 | Rosenbaum ........... | B60T 7/085 188/158 |
| 2018/0111671 A1 * | 4/2018 | Shibayama ............ | B63H 11/02 |
| 2018/0251203 A1 * | 9/2018 | Shibayama ............ | B63H 25/02 |

OTHER PUBLICATIONS

Shibayama et al., "Boat and Boat Maneuvering System", U.S. Appl. No. 15/461,513, filed Mar. 17, 2017.

* cited by examiner

*Primary Examiner* — Tyler D Paige
(74) *Attorney, Agent, or Firm* — Keating and Bennett, LLP

(57) ABSTRACT

A boat includes a boat body, a propulsion unit, a steering wheel that turns about a first turning axis and has a circular or substantially circular shape or an arcuate or substantially arcuate shape about the first turning axis, and an operator unit on the steering wheel including a first operator which is located in a first direction with respect to the first turning axis and a second operator which is located in a second direction with respect to the first turning axis, and that performs a throttle operation and a shift operation on the propulsion unit.

23 Claims, 6 Drawing Sheets

BOAT AND BOAT MANEUVERING SYSTEM

CROSS-REFERENCE TO RELATED APPLICATION

This application claims priority to Patent Application No. 2016-208408 filed in Japan on Oct. 25, 2016, the entire contents of which are herein incorporated by reference.

BACKGROUND OF THE INVENTION

1. Field of the Invention

The present invention relates to a boat and a boat maneuvering system.

2. Description of the Related Art

A boat is known in general. Such a boat is disclosed in Japanese Patent Laid-Open No. 2004-068704, for example.

Japanese Patent Laid-Open No. 2004-068704 discloses a boat including a boat body, an outboard motor that propels the boat body, a handle that manipulates the propulsive direction of the outboard motor, and a throttle operator that is located at a position spaced apart from the handle and performs a throttle operation on the outboard motor.

In the conventional boat disclosed in Japanese Patent Laid-Open No. 2004-068704, the handle and the throttle operator are spaced apart from each other, and hence it is necessary for a boat operator to take his or her hands off the handle to perform the throttle operation. Thus, sufficient experience is required to perform smooth steering and throttle operations.

SUMMARY OF THE INVENTION

Preferred embodiments of the present invention provide a boat and a boat maneuvering system that easily perform a smooth steering operation and throttle operation.

A boat according to a preferred embodiment of the present invention includes a boat body, a propulsion unit that propels the boat body, a steering wheel that turns about a first turning axis, manipulates a propulsive direction of the propulsion unit, and has a circular or substantially circular shape or an arcuate or substantially arcuate shape about the first turning axis, and an operator unit on the steering wheel including a first operator which is located in a first direction with respect to the first turning axis and a second operator which is located in a second direction with respect to the first turning axis, and that performs a throttle operation and a shift operation on the propulsion unit.

In a boat according to a preferred embodiment of the present invention, the operator unit which includes the first operator that is located in the first direction with respect to the first turning axis and the second operator that is located in the second direction with respect to the first turning axis and performs the throttle operation and the shift operation on the propulsion unit is on the steering operator. Thus, the user performs the throttle operation and the shift operation on the propulsion unit by manipulating the first operator and the second operator without taking his or her hands off the steering wheel, and hence a smooth steering operation and the throttle operation are facilitated. The first operator and the second operator are located in the first direction and the second direction with respect to the first turning axis, respectively, such that the user performs the throttle operation and the shift operation by his or her right and left hands. Thus, movement of the user to perform the throttle operation and the shift operation is simplified.

In a boat according to a preferred embodiment of the present invention, the first operator is preferably operated to perform the throttle operation on the propulsion unit, and the second operator is preferably operated to perform the shift operation on the propulsion unit. Accordingly, the user operates the first operator with one of his or her hands to perform the throttle operation on the propulsion unit, and operates the second operator with the other of his or her hands to perform the shift operation on the propulsion unit.

In a boat according to a preferred embodiment of the present invention, the operator unit is preferably turned about the first turning axis together with the steering wheel and is preferably turned or pivoted about a second turning axis which is perpendicular or substantially perpendicular to the first turning axis to perform the throttle operation and the shift operation on the propulsion unit. Accordingly, when the steering wheel turns, the operator unit turns dependent on or with turning of the steering wheel, and hence the throttle operation and the shift operation continue to be performed even during the turning of the steering wheel. Furthermore, the operator unit turns or pivots about the second turning axis which is perpendicular or substantially perpendicular to the first turning axis such that movement of the operator unit toward and away from the steering wheel is facilitated, and hence the user is able to operate the propulsion unit by squeezing the operator unit.

In a boat according to a preferred embodiment of the present invention, the operator unit is preferably located behind the steering wheel, and preferably has a shape that extends along a shape of the steering wheel. Accordingly, the operator unit is provided along the steering wheel behind the steering wheel, and hence the operator unit is operated from any position regardless of the user's gripping position of the steering wheel.

In such an example, the operator unit preferably has an arcuate or substantially arcuate shape which extends along the steering wheel. Accordingly, the operator unit is easily arranged along the steering wheel having a circular or substantially circular shape or an arcuate or substantially arcuate shape, for example.

In a boat according to a preferred embodiment of the present invention, the first operator is preferably moved in a direction toward the steering wheel to perform the throttle operation on the propulsion unit in a throttle open direction, and is preferably moved in a direction away from the steering wheel to perform the throttle operation on the propulsion unit in a throttle closing direction. Accordingly, the first operator is squeezed toward the steering wheel such that the boat is accelerated, and then the first operator is squeezed more weakly such that the boat is relatively decelerated.

In a boat according to a preferred embodiment of the present invention, the operator unit is preferably urged or biased in a direction away from the steering wheel. Accordingly, the user takes his or her hands off the operator unit to return the operator unit to a reference position. For example, the operator unit is returned to the reference position to close the throttle.

In a boat according to a preferred embodiment of the present invention, the steering wheel preferably turns less than 180 degrees about the first turning axis. Accordingly, the position of the first operator and the position of the second operator are prevented from being reversed by the turning of the steering wheel, and hence the user operates the first operator and the second operator without switching the hand by which the first operator is operated and the hand by which the second operator is operated.

In a boat according to a preferred embodiment of the present invention, the first operator and the second operator of the operator unit are preferably bilaterally symmetrical with respect to each other on the steering wheel when the steering wheel is at a centered position. Accordingly, the user operates the first operator by one of his or her hands, and operates the second operator by the other of his or her hands.

In a boat according to a preferred embodiment of the present invention, the steering wheel is preferably bilaterally symmetric and vertically asymmetric when the steering wheel is at a centered position. Accordingly, even when the steering wheel is turned, a position in which the first operator is located and a position in which the second operator is located are easily determined, and hence the user smoothly performs an operation by operating or manipulating the operator unit.

A boat according to a preferred embodiment of the present invention preferably further includes a detector that detects a position of the operator unit, and the throttle operation and the shift operation on the propulsion unit are preferably performed in response to an electric signal based on the position detected by the detector. Accordingly, unlike an example where the operator unit is mechanically connected, a force required to perform the operations is reduced, and hence the throttle operation and the shift operation on the propulsion unit are facilitated by the operator unit.

In a boat according to a preferred embodiment of the present invention, the first operator preferably performs the throttle operation in a forward movement direction and the shift operation in the forward movement direction, and the second operator preferably performs the throttle operation in a reverse movement direction, the shift operation to a neutral position, the shift operation in the reverse movement direction, and a deceleration operation. Accordingly, a forward movement operation is performed by the first operator, and the deceleration operation and a reverse movement operation are performed by the second operator. Hence, forward and backward movement of the boat is facilitated.

In a boat according to a preferred embodiment of the present invention, the propulsion unit preferably includes a jet propulsion device, an outboard motor, an inboard motor, or an inboard-outboard motor. Accordingly, operation of the propulsion unit including the jet propulsion device, the outboard motor, the inboard motor, or the inboard-outboard motor is facilitated by the operator unit.

In this case, the propulsion unit preferably includes the jet propulsion device, and the boat preferably further includes an electric power steering actuator that generates an assist force that reduces a load applied to a user when the user turns the steering wheel. Accordingly, the load applied to the user when the user turns the boat, which tends to increase in order to turn the boat against water resistance, is reduced by the electric power steering actuator.

A boat maneuvering system according to a preferred embodiment of the present invention includes a steering wheel that turns about a first turning axis, manipulates a propulsive direction of a propulsion unit that propels a boat body, and preferably has a circular or substantially circular shape or an arcuate or substantially arcuate shape about the first turning axis, and an operator unit on the steering wheel including a first operator which is located in a first direction with respect to the first turning axis and a second operator which is located in a second direction with respect to the first turning axis, and that performs a throttle operation and a shift operation on the propulsion unit.

In a boat maneuvering system according to a preferred embodiment of the present invention, the operator unit including the first operator which is located in the first direction with respect to the first turning axis and the second operator which is located in the second direction with respect to the first turning axis and performs the throttle operation and the shift operation on the propulsion unit is on the steering operator. Thus, the user performs the throttle operation and the shift operation on the propulsion unit by the operator unit without taking his or her hands off the steering wheel, and hence the boat maneuvering system that performs a smooth steering operation and throttle operation is provided. The first operator and the second operator are located in the first direction and the second direction with respect to the first turning axis, respectively, such that the user performs the throttle operation and the shift operation by his or her right and left hands. Thus, movement of the user to perform the throttle operation and the shift operation is facilitated.

In a boat maneuvering system according to a preferred embodiment of the present invention, the first operator is preferably operated to perform the throttle operation on the propulsion unit, and the second operator is preferably operated to perform the shift operation on the propulsion unit. Accordingly, the user operates the first operator with one of his or her hands to perform the throttle operation on the propulsion unit, and operates the second operator with the other of his or her hands to perform the shift operation on the propulsion unit.

In a boat maneuvering system according to a preferred embodiment of the present invention, the operator unit is preferably turned about the first turning axis together with the steering wheel and is preferably turned or pivoted about a second turning axis which is perpendicular or substantially perpendicular to the first turning axis to perform the throttle operation and the shift operation on the propulsion unit. Accordingly, when the steering wheel turns, the operator unit turns dependent on or with the steering wheel, and hence the throttle operation and the shift operation continue to be performed even during the turning of the steering wheel. Furthermore, the operator unit turns or pivots about the second turning axis which is perpendicular or substantially perpendicular to the first turning axis such that movement of the operator unit toward and away from the steering wheel is facilitated. Hence, the user is able to operate the propulsion unit by squeezing the operator unit.

In a boat maneuvering system according to a preferred embodiment of the present invention, the operator unit is preferably located behind the steering wheel, and preferably has a shape that extends along a shape of the steering wheel. Accordingly, the operator unit is provided along the steering wheel behind the steering wheel, and hence the operator unit is operated from any position regardless of the user's gripping position of the steering wheel.

In a boat maneuvering system according to a preferred embodiment of the present invention, the first operator is preferably moved in a direction toward the steering wheel to perform the throttle operation on the propulsion unit in a throttle opening direction, and is preferably moved in a direction away from the steering wheel to perform the throttle operation on the propulsion unit in a throttle closing direction. Accordingly, the first operator is squeezed toward the steering wheel such that the boat is accelerated, and then the first operator is squeezed more weakly such that the boat is relatively decelerated.

In a boat maneuvering system according to a preferred embodiment of the present invention, the steering wheel preferably turns less than 180 degrees about the first turning axis, for example. Accordingly, the position of the first operator and the position of the second operator are prevented from being reversed by the turning of the steering wheel, and hence the user operates the first operator and the second operator without switching the hand by which the first operator is operated and the hand by which the second operator is operated.

A boat maneuvering system according to a preferred embodiment of the present invention preferably further includes a detector that detects a position of the operator unit, and the throttle operation and the shift operation on the propulsion unit are preferably performed in response to an electric signal based on the position detected by the detector. Accordingly, unlike an example where the operator unit is mechanically connected, a force required to perform the operations is reduced, and hence the throttle operation and the shift operation on the propulsion unit are facilitated by the operator unit.

The above and other elements, features, steps, characteristics and advantages of preferred embodiments of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

The structure of a jet propelled boat 100 according to various preferred embodiments of the present invention is now described with reference to FIGS. 1 to 9. In the figures, an arrow FWD represents the forward movement direction (bow direction) of the jet propelled boat 100, and an arrow BWD represents the reverse movement direction (stern direction) of the jet propelled boat 100. In the figures, an arrow R represents the starboard direction of the jet propelled boat 100, and an arrow L represents the portside direction of the jet propelled boat 100. The jet propelled boat 100 is a non-limiting example of a "boat".

Figure 1:
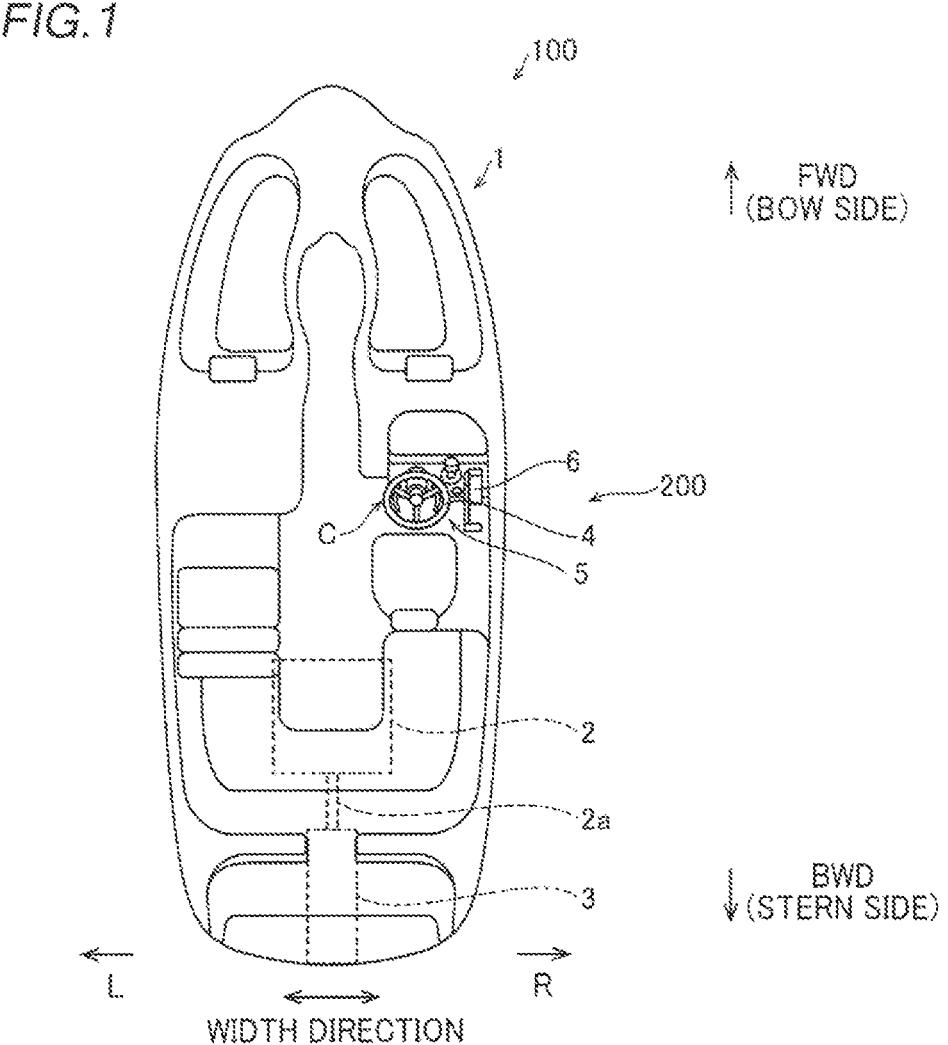
FIG. 1 is a diagram showing a jet propelled boat according to a preferred embodiment of the present invention.
Figure 2:
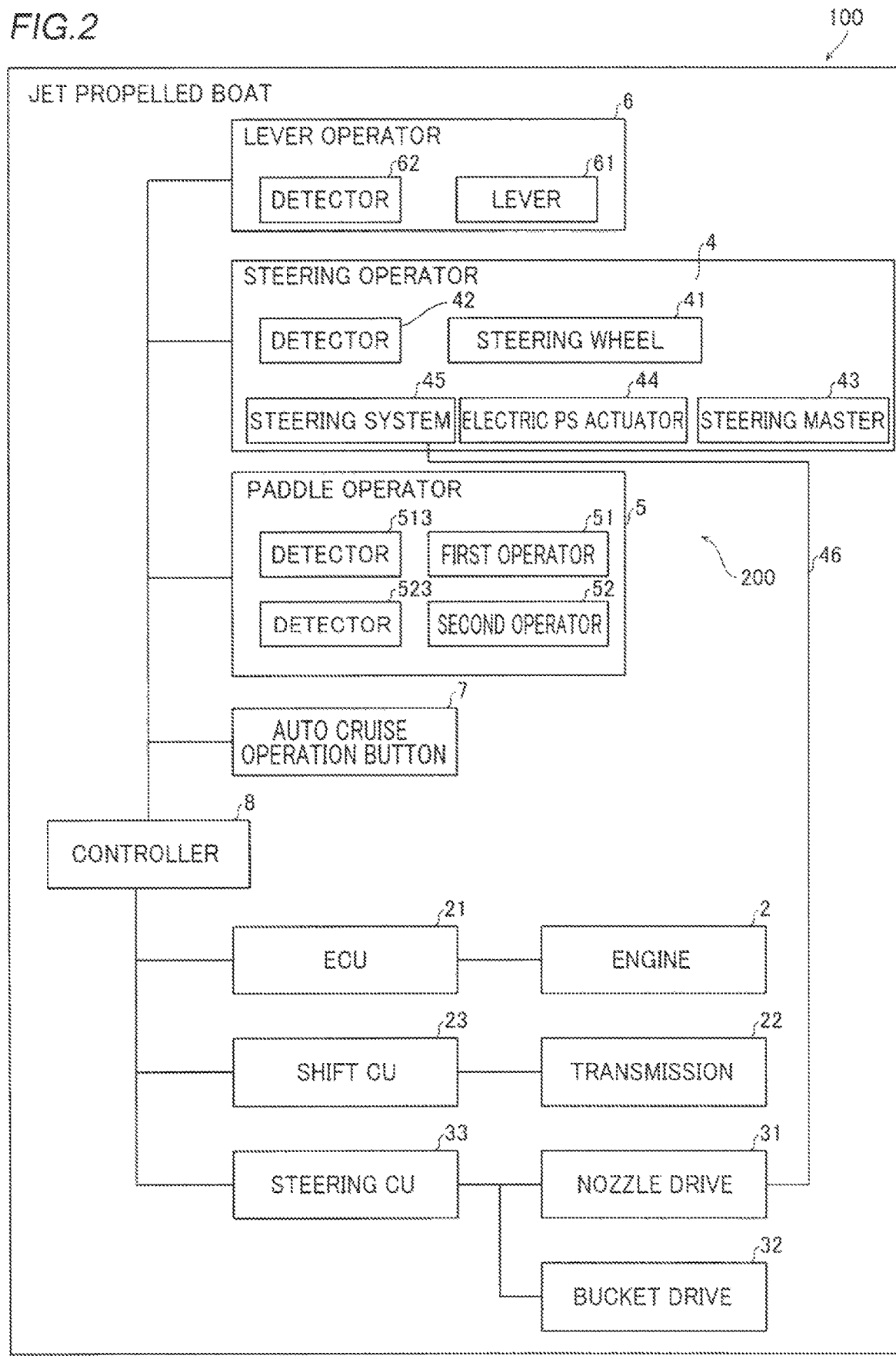
FIG. 2 is a block diagram showing the structure of a jet propelled boat according to a preferred embodiment of the present invention.

The jet propelled boat 100 includes a boat body 1, an engine 2 housed in the boat body 1, and a jet propulsion device 3 connected to the engine 2, as shown in FIG. 1. The jet propelled boat 100 also includes a steering operator 4, a paddle operator 5, a lever operator 6, and an auto cruise operation button 7, as shown in FIG. 2. The engine 2 and the jet propulsion device 3 are non-limiting examples of a "propulsion unit", and the paddle operator 5 is a non-limiting example of an "operator unit".

As shown in FIG. 1, the engine 2 and the jet propulsion device 3 are located inside the boat body 1. The boat body 1 includes an intake gate, through which water is supplied to the jet propulsion device 3, located in a lower portion of the stern. A console is provided on the boat body 1 such that a boat operator or user performs a boat maneuvering operation on the jet propelled boat 100. The steering operator 4, the paddle operator 5, the lever operator 6, and the auto cruise operation button 7 are provided as a boat maneuvering system 200 preferably on the console.

The engine 2 extends from the bow of the boat body 1 toward the stern of the boat body 1, and is located in a rear portion of the boat body 1 on a centerline that passes through the center of the boat body 1 in a width direction. The drive force of the engine 2 is transmitted to the jet propulsion device 3 located in the stern direction with respect to the engine 2 through a drive shaft 2a and a transmission 22 (see FIG. 2).

The jet propulsion device 3 propels the boat body 1. For example, the jet propulsion device 3 generates a jet of water that propels the boat body 1 based on the drive force transmitted from the engine 2 and discharges the jet of water in a desired direction. The jet propulsion device 3 includes an impeller that generates the jet of water by the drive force from the engine 2, and includes an injection nozzle and a bucket that discharge the generated jet of water in the desired direction. The injection nozzle includes a discharge port from which the jet of water is discharged and a nozzle drive 31 (see FIG. 2) that rotates the injection nozzle. The nozzle drive 31 rotates the injection nozzle such that the discharge direction of the discharge port is adjusted. Thus, the movement direction of the jet propelled boat 100 is controlled. The bucket includes a bucket drive 32 (see FIG. 2) that rotates the bucket. The bucket is located at a position in which the bucket does not cover the discharge port such that the jet of water is discharged backward (along arrow BWD) from the discharge port. Alternatively, the bucket may be located at a position in which the bucket covers the discharge port such that the jet of water hits the bucket and is discharged forward (along arrow FWD) or in a transverse direction. Accordingly, the discharge direction of the jet of water discharged from the discharge port of the injection nozzle is adjusted to a predetermined direction in a horizontal plane including a front-back direction.

Figure 3:
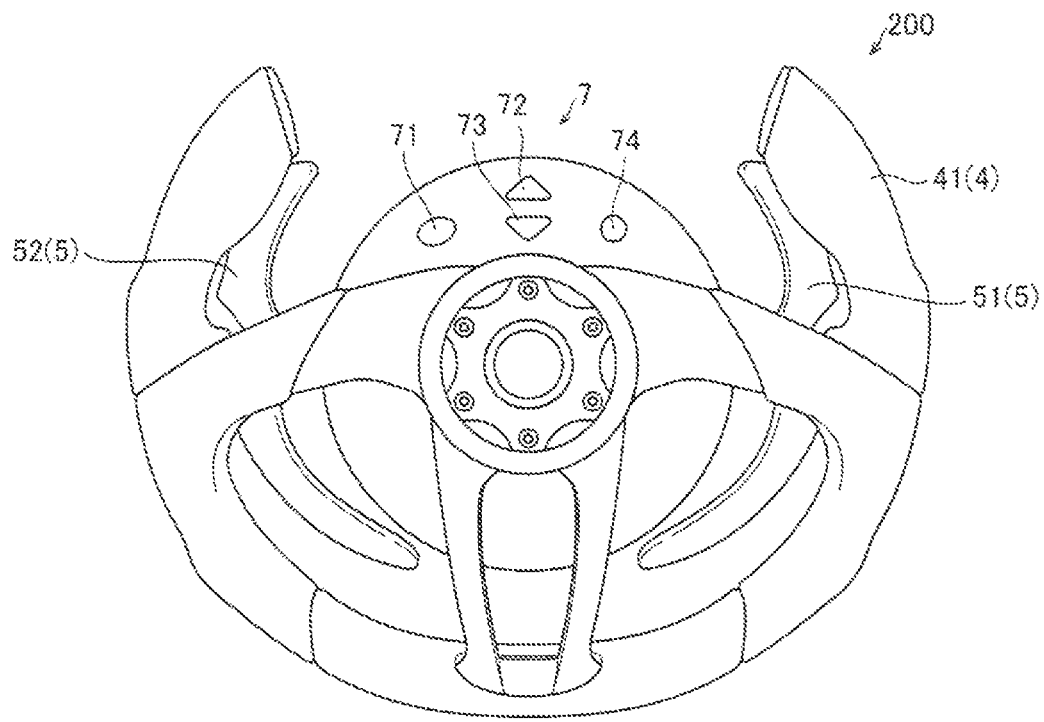
FIG. 3 is a diagram showing a boat maneuvering system of a jet propelled boat according to a preferred embodiment of the present invention.

The steering operator 4 manipulates the movement direction of the jet propelled boat 100. For example, the steering operator 4 manipulates the propulsive direction of the jet propulsion device 3. In other words, when the steering operator 4 is turned to the right, the discharge port of the jet propulsion device 3 is turned in a rightward direction. When the steering operator 4 is turned to the left, the discharge port of the jet propulsion device 3 is turned in a leftward direction. The steering operator 4 includes a steering wheel 41 and a detector 42 that detects the position of the steering wheel 41, as shown in FIG. 2. The paddle operator 5, which includes a first operator 51 and a second operator 52, is located or provided on the steering operator 4 which includes the steering wheel 41, as shown in FIG. 3.

Figure 4:
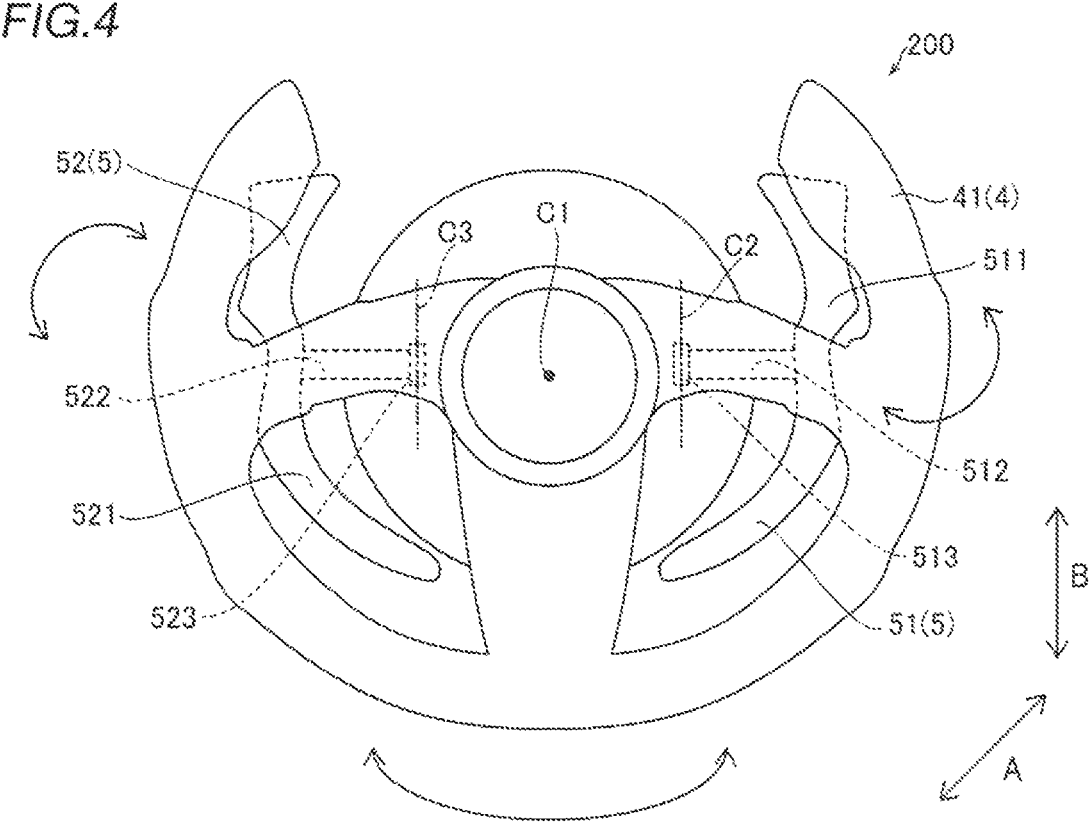
FIG. 4 illustrates an operation on a boat maneuvering system according to a preferred embodiment of the present invention.
Figure 5:
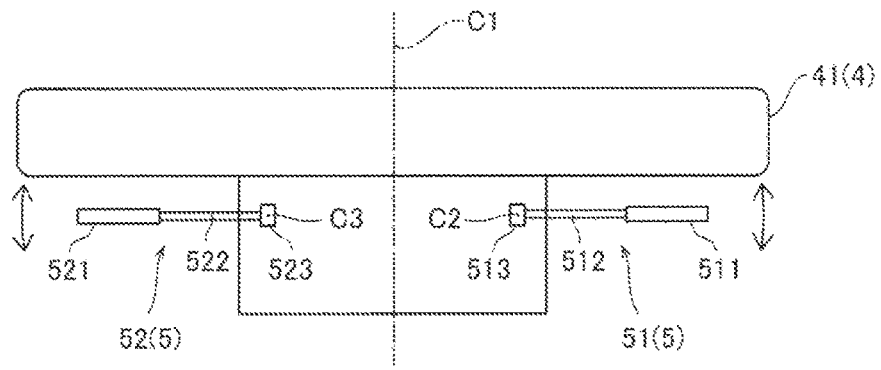
FIG. 5 is a bottom view showing a boat maneuvering system according to a preferred embodiment of the present invention.

The steering wheel 41 turns about a first turning axis C1, as shown in FIGS. 4 and 5. The steering wheel 41 manipulates the propulsive direction of the jet propulsion device 3. The steering wheel 41 preferably has an arcuate or substantially arcuate shape, as shown in FIG. 3. When the steering wheel 41 is at a centered position, the steering wheel 41 is bilaterally symmetric and vertically asymmetric. For example, an upper portion of the steering wheel 41 is separated, and a lower portion thereof is connected.

Figure 6:
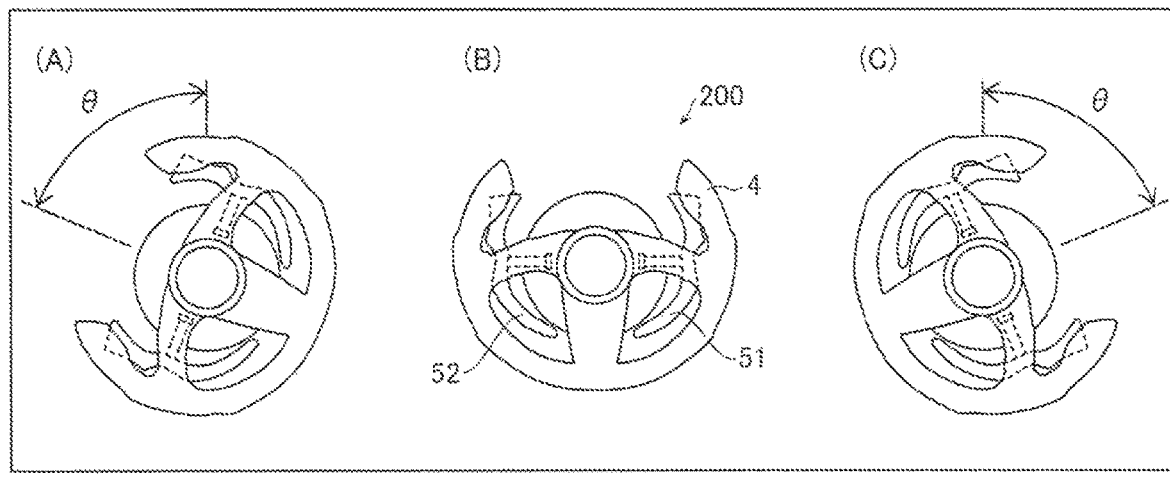
FIG. 6 illustrates a turning range of a steering wheel of a boat maneuvering system according to a preferred embodiment of the present invention.

The steering wheel 41 preferably turns less than 180 degrees about the first turning axis C1, for example, as shown in FIG. 6. For example, the steering wheel 41 turns θ to each of the right and the left with respect to the centered position. θ is an angle that is preferably less than 90 degrees, for example. In other words, a turnable angle 2θ is preferably less than 180 degrees, for example. The turnable angle 2θ is set to about 135 degrees, for example. View (A) of FIG. 6 shows a left end of a turnable position when the steering wheel 41 is turned to the left. View (B) of FIG. 6 shows the centered position of the steering wheel 41. View (C) of FIG. 6 shows a right end of the turnable position when the steering wheel 41 is turned to the right.

The detector 42 detects the position of the steering wheel 41 and transmits a signal to a controller 8, as shown in FIG. 2. The propulsive direction of the jet propulsion device 3 is manipulated based on the signal from the detector 42.

The paddle operator 5 is provided on the steering wheel 41, as shown in FIG. 3. The paddle operator 5 performs a throttle operation on the engine 2, and performs a shift operation (forward movement, reverse movement, or neutral) on the engine 2 and the jet propulsion device 3. The paddle operator 5 includes the first operator 51 and the second operator 52. As shown in FIG. 4, the first operator 51 includes a paddle 511, a connector 512, and a detector 513. The second operator 52 includes a paddle 521, a connector 522, and a detector 523.

The first operator 51 is located in a first direction with respect to the first turning axis C1. The second operator 52 is located in a second direction with respect to the first turning axis C1. For example, the first operator 51 and the second operator 52 are bilaterally symmetrical with respect to each other on the steering wheel 41 when the steering wheel 41 is at the centered position. The first operator 51 is located in the right direction with respect to the first turning axis C1 when the steering wheel 41 is at the centered position. The second operator 52 is located in the left direction with respect to the first turning axis C1 when the steering wheel 41 is at the centered position. In other words, the first operator 51 is located so to be operated by the boat operator's right hand. The second operator 52 is located so to be operated by the boat operator's left hand.

The boat operator operates the first operator 51 to perform the throttle operation and the forward movement shift operation on the engine 2. The boat operator operates the second operator 52 to perform a reverse movement throttle operation, deceleration, and the shift operation on the engine 2 and the jet propulsion device 3. For example, the throttle operation in the forward movement direction and the shift operation in the forward movement direction are performed by the first operator 51. The throttle operation in the reverse movement direction, the shift operation to a neutral position, the shift operation in the reverse movement direction, and a deceleration operation are performed by the second operator 52.

The first operator 51 moves in a direction toward the steering wheel 41 to perform the throttle operation in a direction that opens a throttle of the engine 2 (a throttle opening direction). The first operator 51 moves in a direction away from the steering wheel 41 to perform the throttle operation in a direction that closes the throttle of the engine (a throttle closing direction). In other words, the boat operator squeezes the first operator 51 strongly or weakly to open or close the throttle of the engine 2. When the engine 2 is in neutral, the first operator 51 moves in the direction toward the steering wheel 41 to change the shift operation to a forward movement.

The second operator 52 moves in the direction toward the steering wheel 41 such that the deceleration operation in the forward movement direction is performed. The second operator 52 moves in the direction toward the steering wheel 41 such that the shift operation is changed to a reverse movement. In other words, the second operator 52 moves in the direction toward the steering wheel 41 such that the discharge port is covered by the bucket of the jet propulsion device 3. After the second operator 52 moves in the direction toward the steering wheel 41, the second operator 52 moves in the direction away from the steering wheel 41 to change the shift operation of the engine 2 to the neutral position.

The paddle operator 5 turns about the first turning axis C1 together with the steering wheel 41, as shown in FIG. 5. For example, the first operator 51 and the second operator 52 of the paddle operator 5 are mounted in the vicinity of the first turning axis C1 of the steering wheel 41 at second turning axes C2 and C3, respectively. As shown in FIGS. 5 and 6, the paddle operator 5 is turned about the second turning axes C2 and C3 perpendicular or substantially perpendicular to the first turning axis C1 to perform the throttle operation and the shift operation on the engine 2 and the jet propulsion device 3. For example, the first operator 51 is mounted on the steering wheel 41 and turns about the second turning axis C2. The second operator 52 is mounted on the steering wheel 41 and turns about the second turning axis C3. The second turning axes C2 and C3 are parallel or substantially parallel to each other.

The paddle operator 5 is located behind the steering wheel 41 in a rearward direction. The paddle operator 5 preferably has a shape that emulates or extends along the steering wheel 41. For example, the paddle operator 5 preferably has an arcuate or substantially arcuate shape which extends along the steering wheel 41. In other words, the paddle 511 of the first operator 51 is located behind a right portion of the steering wheel 41. The paddle 511 preferably has a shape that extends along the curve of the right portion of the steering wheel 41. The paddle 521 of the second operator 52 is located behind a left portion of the steering wheel 41. The paddle 521 preferably has a shape that extends along the curve of the left portion of the steering wheel 41. The first operator 51 and the second operator 52 of the paddle operator 5 are preferably bilaterally symmetrical with respect to each other on the steering wheel 41 when the steering wheel 41 is at the centered position.

The paddle 511 of the first operator 51 is connected to the connector 512. The connector 512 is located behind the steering wheel 41, and extends in the radial direction of the steering wheel 41. The paddle 511 is connected radially outwardly of the connector 512. The second turning axis C2 on which the detector 513 is provided is connected radially inwardly (in a direction in which the first turning axis C1 is located) of the connector 512. The paddle 511 turns in the direction toward the steering wheel 41 and in the direction away from the steering wheel 41 about the second turning axis C2.

The paddle 521 of the second operator 52 is connected to the connector 522. The connector 522 is located behind the steering wheel 41, and extends in the radial direction of the steering wheel 41. The paddle 521 is connected radially outwardly of the connector 522. The second turning axis C3 on which the detector 523 is provided is connected radially inwardly (in the direction in which the first turning axis C1 is located) of the connector 522. The paddle 521 turns in the direction toward the steering wheel 41 and in the direction away from the steering wheel 41 about the second turning axis C3.

The paddle operator 5 is urged or biased in the direction away from the steering wheel 41. The paddles 511 and 521 are moved in the direction away from the steering wheel 41 (in the rearward direction) when the boat operator releases his or her hands from the paddles 511 and 521 or the boat operator squeezes the paddles 511 and 521 more weakly.

The detector 513 detects the position of the paddle 511 of the first operator 51 and transmits an electric signal to the controller 8, as shown in FIG. 2. The throttle operation and shift operation on the engine 2 are performed based on the electric signal from the detector 513. The detector 523 detects the position of the paddle 521 of the second operator 52 and transmits an electric signal to the controller 8. The shift operation on the engine 2 and the jet propulsion device 3 is performed based on the electric signal from the detector 523.

The lever operator 6 performs the throttle operation and the shift operation on the engine 2 and the jet propulsion device 3 instead of the paddle operator 5. The lever operator 6 includes a lever 61 and a detector 62. The user moves the lever 61 such that the throttle operation and the shift operation are performed. The detector 62 detects the movement of the lever 61 and transmits an electric signal to the controller 8. The throttle operation and the shift operation on the engine 2 and the jet propulsion device 3 are performed based on the electric signal from the detector 62.

The auto cruise operation button 7 is provided on the steering operator 4, as shown in FIG. 3. The auto cruise operation button 7 includes a mode switching button 71, a speed-up button 72, a slowdown button 73, and a low speed switching button 74. The auto cruise operation button 7 is operated when the jet propelled boat 100 is moving at a constant speed. The user operates the mode switching button 71 to switch between an auto cruise state and a normal cruise state. In the auto cruise state, the jet propelled boat 100 moves at a speed set by the speed-up button 72 and the slowdown button 73. In the normal cruise state, the jet propelled boat 100 moves in a state corresponding to the throttle operation performed by the paddle operator 5 or the lever operator 6. The user operates the low speed switching button 74 to switch to a low speed state. In the low speed state, the jet propelled boat 100 is controlled not to move at a predetermined speed or more when moving in a harbor or the like, for example.

The steering operator 4 preferably includes a trim adjustment button. The trim adjustment button adjusts the trim angle of the jet propulsion device 3. The trim angle is the vertical angle of the discharge port of the jet propulsion device 3.

The jet propelled boat 100 includes the controller 8, an engine control unit (ECU) 21, a shift control unit (shift CU) 23, and a steering control unit (steering CU) 33 as a control system, as shown in FIG. 2.

The controller 8 preferably includes a central processing unit (CPU) or the like, and controls the entire jet propelled boat 100. The ECU 21 controls the driving of the engine 2 according to the operation of the paddle operator 5 or the lever operator 6 based on a command from the controller 8. The shift CU 23 controls the switching of the transmission 22 according to the operation of the paddle operator 5 or the lever operator 6 based on a command from the controller 8. The steering CU 33 drives the nozzle drive 31 and the bucket drive 32 according to the operation of the steering operator 4 based on a command from the controller 8. Thus, the rotation of the injection nozzle and the rotation of the bucket are controlled.

Figure 7:
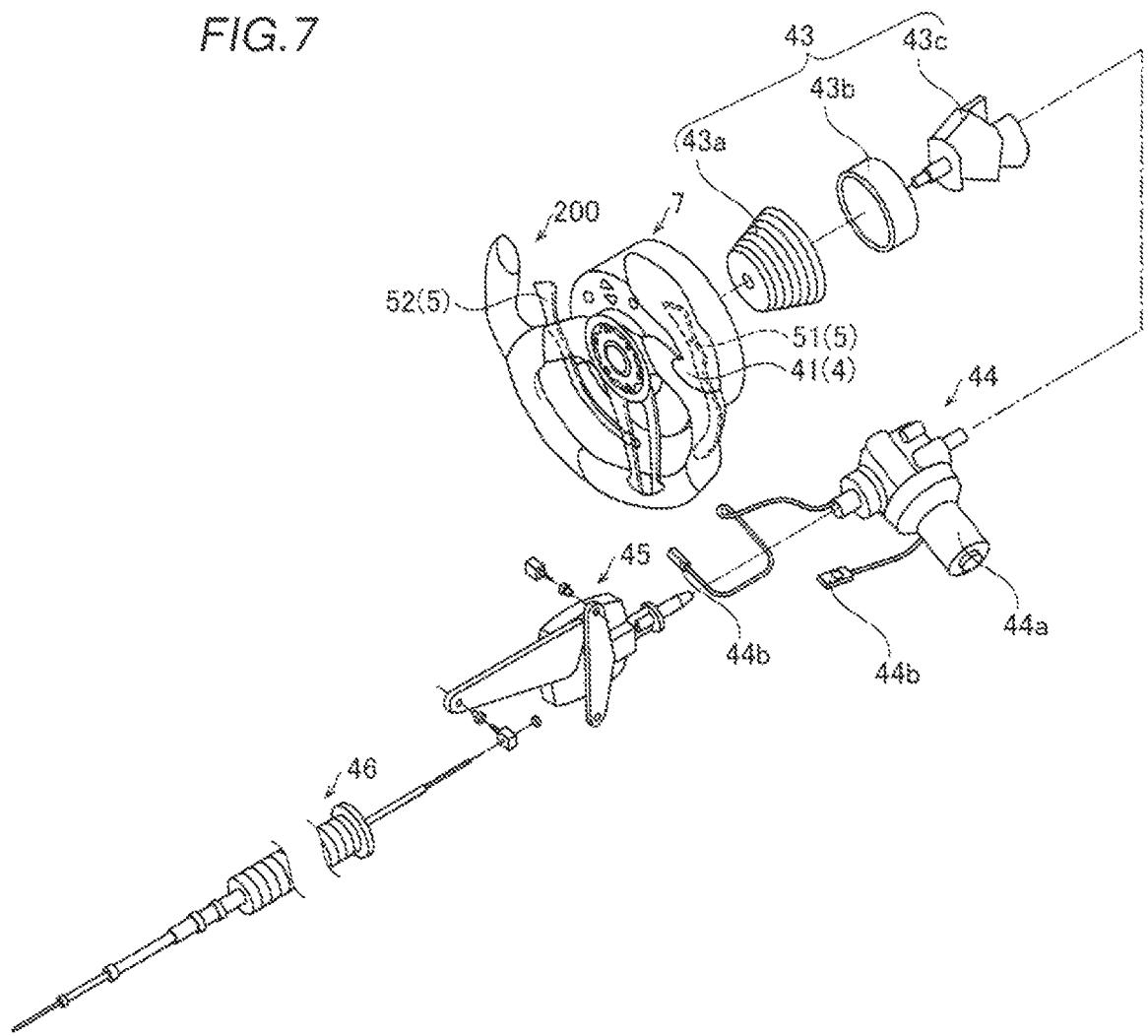
FIG. 7 is an exploded perspective view showing a steering operator of a jet propelled boat according to a preferred embodiment of the present invention.
Figure 8:
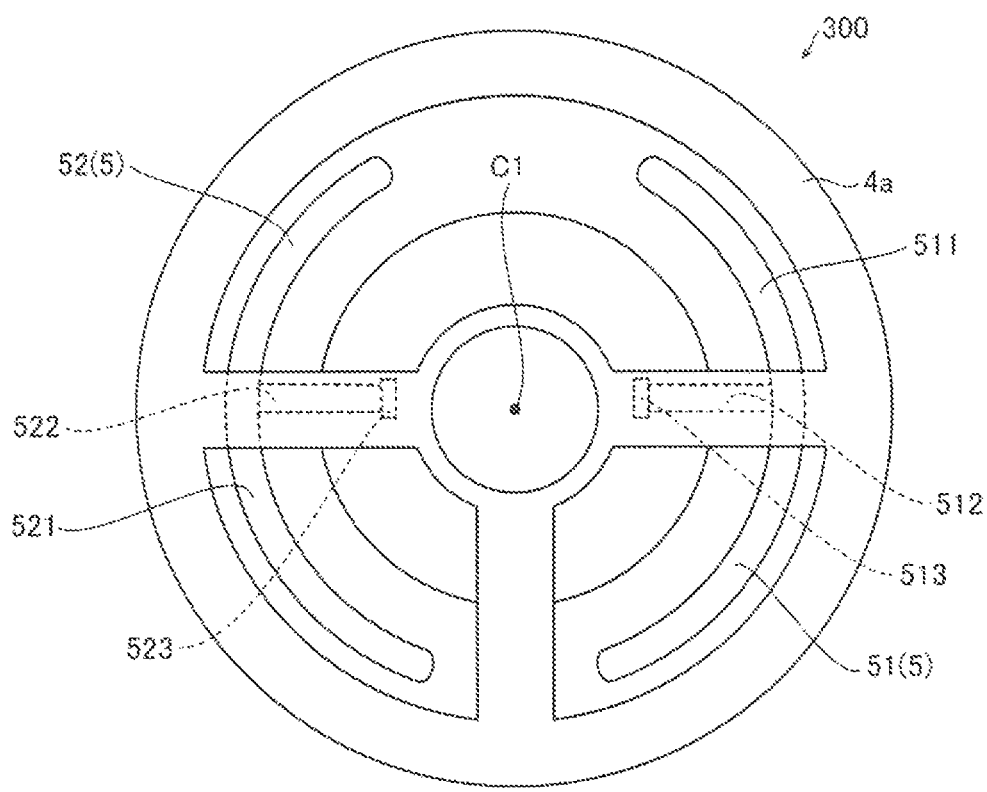
FIG. 8 is a diagram showing a boat maneuvering system according to a first modified preferred embodiment of the present invention.

As shown in FIGS. 2 and 7, the steering operator 4 includes a steering master 43, an electric power steering actuator (electric PS actuator) 44, a steering system 45, and a steering wire 46 connected to the nozzle drive 31. The electric PS actuator 44 and the steering system 45 are housed in a console C (see FIG. 1).

The steering master 43 is located between the console C and the steering wheel 41, and adjusts the inclination of the steering wheel 41. The steering master 43 includes a bellows-shaped first cover 43a, a second cover 43b, and a tilt body 43c covered by the first cover 43a and the second cover 43b and that holds the inclined state of the steering wheel 41.

The electric PS actuator 44 generates an assist force that reduces a load applied to the user when the user turns the steering wheel 41. The electric PS actuator 44 includes an electric motor 44a and a connector 44b that connects the electric PS actuator 44 to the controller 8, etc. The controller 8 is configured or programmed to control the electric PS actuator 44 based on the position of the steering wheel 41 detected by the detector 42, for example, to generate the assist force. The electric PS actuator 44 is housed in the console C, and hence the electric PS actuator 44 is hardly affected by water.

It is preferable to perform a process on the electric PS actuator 44 so that the electric PS actuator 44 is less affected by water. For example, it is preferable to provide an anti-rust coating such as plating to significantly reduce or prevent salt damage (corrosion) or the like on the electric PS actuator 44, and it is preferable to use a waterproof connector as the connector 44b in order to significantly reduce or prevent electric leakage.

In the jet propelled boat 100 including the jet propulsion device 3, when the user turns the steering wheel 41 to turn the jet propelled boat 100, the load on the turning operation is continuously applied to the steering wheel 41 from the start to the end of the turning operation. Therefore, the electric PS actuator 44 preferably continuously applies the assist force from the start to the end of the turning operation.

When an electric PS actuator for a land-based vehicle that applies a load concentrated mainly at the start of the turning is used as the electric PS actuator 44 of the jet propelled boat 100, the electric motor 44a and a control program for the electric motor 44a may be changed such that the assist force is continuously applied from the start to the end of the turning operation.

When the electric PS actuator 44 including the electric motor 44a is used, it is not necessary to provide a complex device configuration in order to control the hydraulic pressure, and hence the number of components is effectively reduced as compared with the case in which a hydraulic power steering actuator is used.

The steering system 45 defines and functions as a converter that converts the turning operation of the steering wheel 41 into linear movement of the steering wire 46. Thus, the turning operation of the steering wheel 41 is transmitted to the nozzle drive 31 via the steering system 45 and the steering wire 46. At this time, the electric PS actuator 44 assists the user to turn the steering wheel 41.

According to the various preferred embodiments of the present invention described above, the following advantageous effects are achieved.

According to a preferred embodiment of the present invention, the paddle operator 5 is provided on the steering operator 4, includes the first operator 51 located in the first direction with respect to the first turning axis C1 and the second operator 52 located in the second direction with respect to the first turning axis C1, and performs the throttle operation and the shift operation on the engine 2 and the jet propulsion device 3. Thus, the user performs the throttle operation and the shift operation on the engine 2 and the jet propulsion device 3 using the first operator 51 and the second operator 52 of the paddle operator 5 without taking his or her hands off the steering wheel 41, and hence a smooth steering operation and throttle operation are easily performed. The first operator 51 and the second operator 52 are located in the first direction and the second direction with respect to the first turning axis C1, respectively, such that the user performs the throttle operation and the shift operation with his or her right and left hands. Thus, the movement of the user to perform the throttle operation and the shift operation is facilitated.

According to a preferred embodiment of the present invention, the first operator 51 performs the throttle operation on the engine 2, and the second operator 52 performs the shift operation on the engine 2 and the jet propulsion device 3. Thus, the user operates the first operator 51 with one of his or her hands to perform the throttle operation on the engine 2, and operates the second operator 52 with the other of his or her hands to perform the shift operation on the engine 2 and the jet propulsion device 3.

According to a preferred embodiment of the present invention, the paddle operator 5 is turned about the first turning axis C1 together with the steering wheel 41 and is turned about the second turning axes C2 and C3 perpendicular or substantially perpendicular to the first turning axis C1 to perform the throttle operation and the shift operation on the engine 2 and the jet propulsion device 3. Thus, when the steering wheel 41 turns, the paddle operator 5 turns with the steering wheel 41, and hence the throttle operation and the shift operation continue to be performed even during the turning of the steering wheel 41. Furthermore, the paddle operator 5 turns about the second turning axes C2 and C3 perpendicular or substantially perpendicular to the first turning axis C1 such that the paddle operator 5 is easily moved toward and away from the steering wheel 41, and hence the user easily operates the engine 2 and the jet propulsion device 3 by squeezing the paddle operator 5.

According to a preferred embodiment of the present invention, the paddle operator 5 is located behind the steering wheel 41, and preferably has a shape that extends along the steering wheel 41. Thus, the paddle operator 5 is located along the steering wheel 41 behind the steering wheel 41, and hence the paddle operator 5 is operated from any position regardless of the gripping position of the steering wheel 41.

According to a preferred embodiment of the present invention, the paddle operator 5 preferably has an arcuate or substantially arcuate shape which extends along the steering wheel 41. Thus, the paddle operator 5 is easily arranged along the steering wheel 41 having an arcuate or substantially arcuate shape.

According to a preferred embodiment of the present invention, the first operator 51 moves in the direction toward the steering wheel 41 to perform the throttle operation in the throttle opening direction on the engine 2, and moves in the direction away from the steering wheel 41 to perform the throttle operation in the throttle closing direction on the engine 2. Thus, the first operator 51 is squeezed toward the steering wheel 41 such that the jet propelled boat 100 is accelerated, and the first operator 51 is squeezed more weakly such that the jet propelled boat 100 is decelerated.

According to a preferred embodiment of the present invention, the paddle operator 5 is urged in the direction away from the steering wheel 41. Thus, the user takes his or her hands off the paddle operator 5 to return the paddle operator 5 to a reference position. Consequently, the paddle operator 5 is returned to the reference position to close the throttle.

According to a preferred embodiment of the present invention, the steering wheel 41 preferably turns less than 180 degrees, for example, about the first turning axis C1. Thus, the position of the first operator 51 and the position of the second operator 52 are prevented from being reversed by the turning of the steering wheel 41, and hence the user operates the first operator 51 and the second operator 52 without switching the hand that operates the first operator 51 and the hand that operates the second operator 2.

According to a preferred embodiment of the present invention, the first operator 51 and the second operator 52 of the paddle operator 5 are preferably bilaterally symmetrical with respect to each other on the steering wheel 41 when the steering wheel 41 is at the centered position. Thus, the user operates the first operator 51 by one of his or her hands, and operates the second operator 52 by the other of his or her hands.

According to a preferred embodiment of the present invention, the steering wheel 41 is preferably bilaterally symmetric and vertically asymmetric when the steering wheel 41 is at the centered position. Thus, even when the steering wheel 41 is turned, a position in which the first operator 51 is located and a position in which the second operator 52 is located are easily determined, and hence the user smoothly performs an operation by the paddle operator 5.

According to a preferred embodiment of the present invention, the paddle operator 5 includes the detectors 513 and 523 that detect the position of the operated paddle operator 5, and the throttle operation and the shift operation on the engine 2 and the jet propulsion device 3 are performed by electric signals based on the positions detected by the detectors 513 and 523. Thus, unlike the case where the paddle operator 5 is mechanically connected, a force required to operate the paddle operator 5 is reduced, and hence the throttle operation and the shift operation on the engine 2 and the jet propulsion device 3 are facilitated by the paddle operator 5.

According to a preferred embodiment of the present invention, the first operator 51 performs the throttle operation in the forward movement direction and the shift operation in the forward movement direction, and the second operator 52 performs the throttle operation in the reverse movement direction, the shift operation to the neutral position, the shift operation in the reverse movement direction, and the deceleration operation. Thus, a forward movement operation is performed by the first operator 51 while the deceleration operation and a reverse movement operation are performed by the second operator 52, and hence forward and backward movement of the jet propelled boat 100 is facilitated.

According to a preferred embodiment of the present invention, the jet propelled boat 100 includes the electric PS actuator 44 that generates the assist force and reduces the load applied to the user when the user turns the steering wheel 41. Thus, the load applied to the user when the user turns the jet propelled boat 100, which tends to increase in order to turn the jet propelled boat 100 against water resistance, is reduced by the electric PS actuator 44.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while preferred embodiments of the present invention are described above as being preferably applied to a jet propelled boat, the present invention is not restricted to this. Preferred embodiments of the present invention may alternatively be applied to a boat other than a jet propelled boat. Preferred embodiments of the present invention may be applied to a boat including an outboard motor or a boat including an inboard motor. Preferred embodiments of the present invention may also be applied to a boat including an inboard-outboard (stern drive) motor.

Preferred embodiments of the present invention are also not restricted to one engine and one jet propulsion device as the propulsion unit. Alternatively, a plurality of propulsion units may be provided in the boat.

Preferred embodiments of the present invention are not restricted to a steering wheel having an arcuate or substantially arcuate shape in which its upper portion is separated. Alternatively, the steering wheel may have a circular or substantially circular shape as a steering wheel 4a in a boat maneuvering system 300 according to a first modified preferred embodiment of the present invention shown in FIG. 8.

Figure 9:
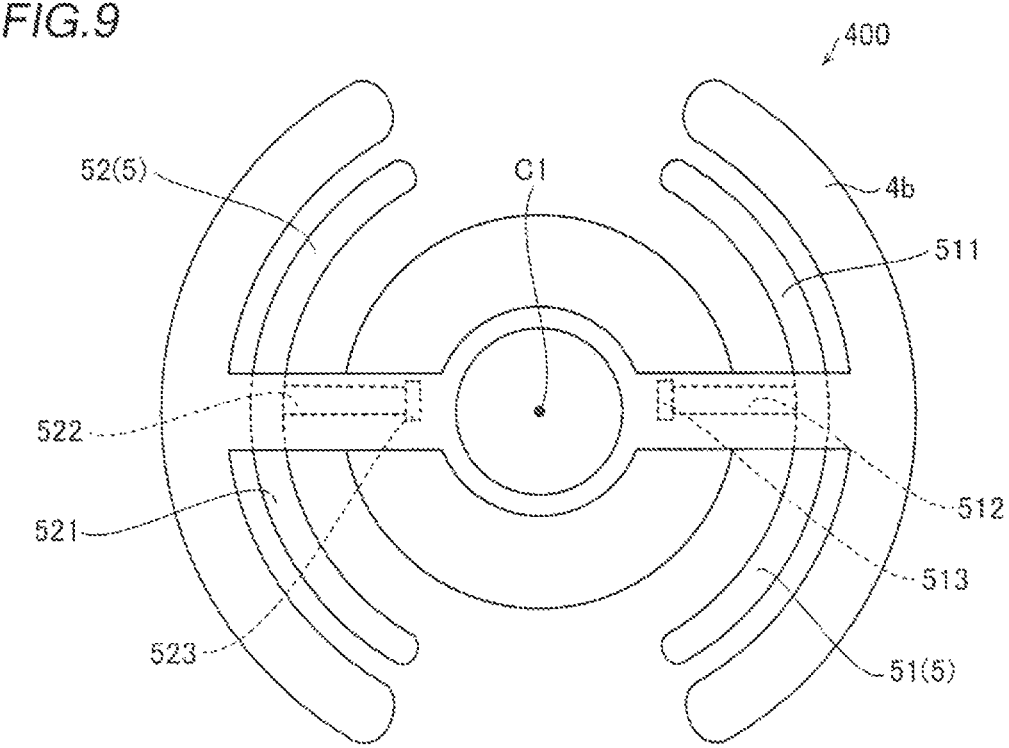
FIG. 9 is a diagram showing a boat maneuvering system according to a second modified preferred embodiment of the present invention.

In another alternative, the steering wheel may have an arcuate or substantially arcuate shape in which both its upper portion and its lower portion are separated as a steering wheel 4b in a boat maneuvering system 400 according to a second modified preferred embodiment of the present invention shown in FIG. 9. In other words, a portion of the steering wheel gripped by the user's right hand and a portion of the steering wheel gripped by the user's left hand may be completely separate from each other.

Preferred embodiments of the present invention are not restricted to the lever operator being provided in addition to the paddle operator to perform the throttle operation and the shift operation on the engine and the jet propulsion device. Alternatively, there may be no lever operator.

Preferred embodiments of the present invention are not restricted to the steering wheel turning less than 180 degrees about the first turning axis. Alternatively, the steering wheel may turn 180 degrees or more about the first turning axis. In this example, the steering wheel preferably turns less than 360 degrees about the first turning axis.

Preferred embodiments of the present invention are not restricted to the electric PS actuator 44 used to generate the assist force that reduces the load applied to the user when the user turns the steering wheel 41. Alternatively, a power steering actuator including a drive source other than an electric motor such as a hydraulic actuator may be used to generate an assist force. Furthermore, an assist force may not be generated.

While the preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A boat comprising:
   a boat body;
   a propulsion unit that propels the boat body;
   a steering wheel that turns about a first turning axis to change a propulsive direction of the propulsion unit; and
   a paddle operator on the steering wheel and including a first paddle and a second paddle; wherein
   at least one of the first paddle and the second paddle performs a throttle operation and a shift operation on the propulsion unit.

2. The boat according to claim 1, wherein operation of the first paddle performs the throttle operation on the propulsion unit, and operation of the second paddle performs the shift operation on the propulsion unit.

3. The boat according to claim 1, wherein the paddle operator is turned about the first turning axis together with the steering wheel, and pivots about a second turning axis which is located perpendicular or substantially perpendicular to the first turning axis to perform the throttle operation and the shift operation on the propulsion unit.

4. The boat according to claim 1, wherein the paddle operator is located behind the steering wheel and extends along the steering wheel.

5. The boat according to claim 4, wherein the paddle operator has an arcuate or substantially arcuate shape which extends along the steering wheel.

6. The boat according to claim 1, wherein the first paddle moves in a direction toward the steering wheel to perform the throttle operation on the propulsion unit in a throttle opening direction, and moves in a direction away from the steering wheel to perform the throttle operation on the propulsion unit in a throttle closing direction.

7. The boat according to claim 1, wherein the paddle operator is biased in a direction away from the steering wheel.

8. The boat according to claim 1, wherein the steering wheel turns less than 180 degrees about the first turning axis.

9. The boat according to claim 1, wherein the first paddle and the second paddle are bilaterally symmetrical with respect to each other on the steering wheel when the steering wheel is at a centered position.

10. The boat according to claim 1, wherein the steering wheel is bilaterally symmetric and vertically asymmetric when the steering wheel is at a centered position.

11. The boat according to claim 1, further comprising a detector that detects a position of the paddle operator; wherein
    the throttle operation and the shift operation on the propulsion unit are performed in response to an electric signal based on the position detected by the detector.

12. The boat according to claim 1, wherein
    the first paddle performs the throttle operation in a forward movement direction and the shift operation in the forward movement direction; and the second paddle performs the throttle operation in a reverse movement direction, the shift operation to a neutral position, the shift operation in the reverse movement direction, and a deceleration operation.

13. The boat according to claim 1, wherein the propulsion unit includes a jet propulsion device, an outboard motor, an inboard motor, or an inboard-outboard motor.

14. The boat according to claim 13, wherein the propulsion unit includes the jet propulsion device, and the boat further comprises:
an electric power steering actuator that generates an assist force that reduces a load applied to a user when the user turns the steering wheel.

15. The boat according to claim 1, wherein the first paddle is located in a first direction with respect to the first turning axis, and the second paddle is located in a second direction with respect to the first turning axis.

16. A boat maneuvering system comprising:
a steering wheel that turns about a first turning axis to change a propulsive direction of a propulsion unit that propels a boat body; and
an paddle operator on the steering wheel and including a first paddle and a second paddle; wherein
at least one of the first paddle and the second paddle performs a throttle operation and a shift operation on the propulsion unit.

17. The boat maneuvering system according to claim 16, wherein operation of the first paddle performs the throttle operation on the propulsion unit, and operation of the second paddle performs the shift operation on the propulsion unit.

18. The boat maneuvering system according to claim 16, wherein the paddle operator is turned about the first turning axis together with the steering wheel and is pivoted about a second turning axis which is located perpendicular or substantially perpendicular to the first turning axis to perform the throttle operation and the shift operation on the propulsion unit.

19. The boat maneuvering system according to claim 16, wherein the paddle operator is located behind the steering wheel and extends along the steering wheel.

20. The boat maneuvering system according to claim 16, wherein the first paddle moves in a direction toward the steering wheel to perform the throttle operation on the propulsion unit in a throttle opening direction, and moves in a direction away from the steering wheel to perform the throttle operation on the propulsion unit in a throttle closing direction.

21. The boat maneuvering system according to claim 16, wherein the steering wheel turns less than 180 degrees about the first turning axis.

22. The boat maneuvering system according to claim 16, further comprising a detector that detects a position of the paddle operator; wherein
the throttle operation and the shift operation on the propulsion unit are performed in response to an electric signal based on the position detected by the detector.

23. The boat maneuvering system according to claim 16, wherein the first paddle is located in a first direction with respect to the first turning axis, and the second paddle is located in a second direction with respect to the first turning axis.

* * * * *